United States Patent
Madour et al.

(10) Patent No.: US 6,904,025 B1
(45) Date of Patent: Jun. 7, 2005

(54) WIDE AREA NETWORK MOBILITY FOR IP BASED NETWORKS

(75) Inventors: Lila Madour, Kista (SE); Shabnam Sultana, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/416,757

(22) Filed: Oct. 12, 1999

(51) Int. Cl.$^7$ ............................................. H04Q 7/00
(52) U.S. Cl. ................................. 370/328; 370/310.2
(58) Field of Search ............................. 370/310.2, 328, 370/331, 332, 333, 338, 395.52; 455/422, 433, 436–439

(56) References Cited

U.S. PATENT DOCUMENTS

| | | | | |
|---|---|---|---|---|
| 5,325,362 | A | * 6/1994 | Aziz | 370/405 |
| 6,069,890 | A | * 5/2000 | White et al. | 370/352 |
| 6,160,804 | A | * 12/2000 | Ahmed et al. | 370/349 |
| 6,195,705 | B1 | * 2/2001 | Leung | 709/245 |
| 6,201,962 | B1 | * 3/2001 | Sturniolo et al. | 455/432 |
| 6,385,451 | B1 | * 5/2002 | Kalliokulju et al. | 455/437 |
| 6,407,988 | B1 | * 6/2002 | Agraharam et al. | 370/328 |
| 6,469,998 | B1 | * 10/2002 | Burgaleta Salinas et al. | 370/338 |
| 6,477,644 | B1 | * 11/2002 | Turunen | 713/161 |
| 6,484,211 | B2 | * 11/2002 | Turunen | 709/245 |
| 6,487,595 | B1 | * 11/2002 | Turunen et al. | 709/226 |
| 6,496,505 | B2 | * 12/2002 | La Porta et al. | 370/392 |

FOREIGN PATENT DOCUMENTS

| | | | | |
|---|---|---|---|---|
| FR | EP 0924914 A2 | * 6/1999 | | H04L/29/06 |
| GB | WO 99/31853 | * 6/1999 | | H04L/29/06 |

OTHER PUBLICATIONS

Pollini et al., "Handover Protocols between Metropolitan Area Networks", 1992, IEEE.□□□□.*

Caceres et al., "Fast and Scalable Wireless Handoffs in Support of Mobile Internet Audio", 1998, Mobile Networks and Applications, Baltzer Science Publishers BV.*

Caceres, R. et al, "Fast and scalable wireless handoffs in support of mobile Internet audio", Mobile Networks and Applications, Baltzer Science Publishers, Bussum, NL, vol. 3, No. 4, 1998, pp. 351–363, XP002135845.

* cited by examiner

*Primary Examiner*—Chi Pham
*Assistant Examiner*—Keith M. George (57) ABSTRACT

A system and method of providing mobility between Internet Protocol (IP) based packet networks is disclosed. The disclosed system and method permits user equipment to roam from one IP based packet network to a second IP based packet network, without any interruption in data communications. Wide area network mobility is achieved through the modification of existing protocols to include additional network gateway addressing information.

12 Claims, 13 Drawing Sheets

WIDE AREA NETWORK MOBILITY FOR IP BASED NETWORKS

BACKGROUND

Applicants' invention relates generally to IP based networks and, more particularly, to mobility between IP based networks.

Fixed data networks, such as the Internet, have conventionally been used for the communication of digital data between different nodes in the network. With the increasing use of mobile nodes, however, such as portable notebook computers, fixed data networks have often become disadvantageous due to the lack of connections to the fixed data network at any specific location to which a mobile node might roam. To solve this problem, data communications using mobile communications system have been implemented to provide mobility for mobile nodes. Such mobile data communications systems typically involve packet radio systems such as General Packet Radio Services (GPRS) or Cellular Digital Packet Data (CDPD) that use IP based protocols. These packet radio systems advantageously permit a mobile node to roam within a cellular network while retaining the ability to initiate data communications at any location within the network.

Mobility in data communications is, however, problematic when a mobile node moves across cellular networks. Thus, if a mobile node moves from a first network to a second network data communications may be lost. For example, in a GPRS system, interGGSN (Gateway GPRS Serving Node) communication is currently not defined and, thus, data packets will be lost because a tunnel cannot be established to reroute data packets to the new Serving GPRS Serving Node (SGSN) in the second network from the old SGSN/GGSN in the first network. Seamless data communication with a mobile node, when the mobile node roams between two heterogeneous packet data networks, thus cannot be achieved using current IP based protocols.

SUMMARY

It is thus an object of the invention to achieve seamless data communication between two IP based packet networks when a user travels from an area serviced by a first data packet network to an area serviced by a second data packet network.

In accordance with a first exemplary embodiment, a method of keeping a session active and connected while changing data communications networks is provided. The method of this exemplary embodiment comprises the steps of: receiving packets, associated with a session, over a first connection in a first data communications network; requesting a second connection with a second data communications network while moving towards the second network; acquiring an address of a gateway associated with the second data communications network, wherein said steps of requesting and/or acquiring use an unsolicited connection procedure; and routing packets, associated with said session, over the second connection based on the acquired gateway address.

In accordance with a second exemplary embodiment of the invention, a method of keeping a session active and connected while changing data communications networks comprises the steps of: receiving packets, associated with a session, from a fist data communications network; moving to a second data communications network; selecting a preferred gateway in the second data communications network; initiating an unsolicited connection procedure in the second network for a second connection, wherein said connection request includes an address of a gateway associated with said first network; forwarding packets, associated with said session, to said preferred gateway through said connection procedure; and receiving said forwarded packets from said preferred gateway over said second connection.

In accordance with a third exemplary embodiment of the invention, a method of keeping a session active and connected while changing data communications networks comprises the steps of: receiving packets, associated with a session, from a first data communications network; sending routing information from a gateway in said first network to one or more gateways in neighboring data communications networks using an unsolicited connection procedure; establishing a connection between user equipment and a second gateway, said second gateway being one of said one or more gateways in the neighboring data communications networks that is associated with a target cell; forwarding packets, associated with said session, from said gateway in said first data communications network to said second gateway; and receiving, in the user equipment, said forwarded packets from said second gateway.

In accordance with a fourth exemplary embodiment of the invention, a method of keeping a session active and connected while changing data communications networks comprises the steps of: receiving packets, associated with a session, from a first data communications network; sending a request for access, from user equipment receiving said packets, to a second data communications network, initiating an unsolicited connection procedure to a gateway in said second data communications network, returning an address of the gateway in the second data communications network to said user equipment; sending said address to a gateway in said first data communications network; forwarding packets, associated with said session, from said gateway in the first data communications network to said gateway in the second data communications network using said address; and receiving, at said user equipment, the forwarded packets from said gateway in said second data communications network.

BRIEF DESCRIPTION OF THE DRAWINGS

The objects and advantages of the invention will be understood by reading the following detailed description in conjunction with the example drawings in which.

DETAILED DESCRIPTION

Seamless data communication can be achieved in exemplary embodiments of the invention through modification of the communication protocol to enable the implementation of inter-packet network roaming. In exemplary embodiments, internetwork roaming is provided at the gateway level (example of gateways: H.323 GW, GPRS gateway, MobileIP Foreign Agent, etc.), where the gateway for the network from which a user has roamed, and the gateway for the network that the user has roamed into, are inter-operable either directly or through another gateway or proxy. To achieve interpacket network roaming, exemplary embodiments allow a request for handover resources, using a new method named as an unsolicited connection procedure, in the network into which the user is roaming (the target network) to be initiated either by the current serving network, the target network, or by user equipment (e.g., user terminal).

The request for hand-over resources in the target network may thus be achieved in exemplary embodiments using three different techniques: 1) serving network initiated handover (SNH), where the gateway in the serving network broadcasts to possible candidate handover gateways using measurement reports provided by the user equipment; 2) target network initiated handover (TNH), where the user equipment requests the target network to notify the current serving network that the user has moved from the network and further requests that packets be forwarded to a new gateway address; and 3) terminal assisted handoff (TAH), where the user equipment performs handoff measurements, requests resources from the target network, and then forwards the information uplink to the current serving gateway which then sets up a communication path with the target gateway as supplied by the user equipment.

Figure 3:
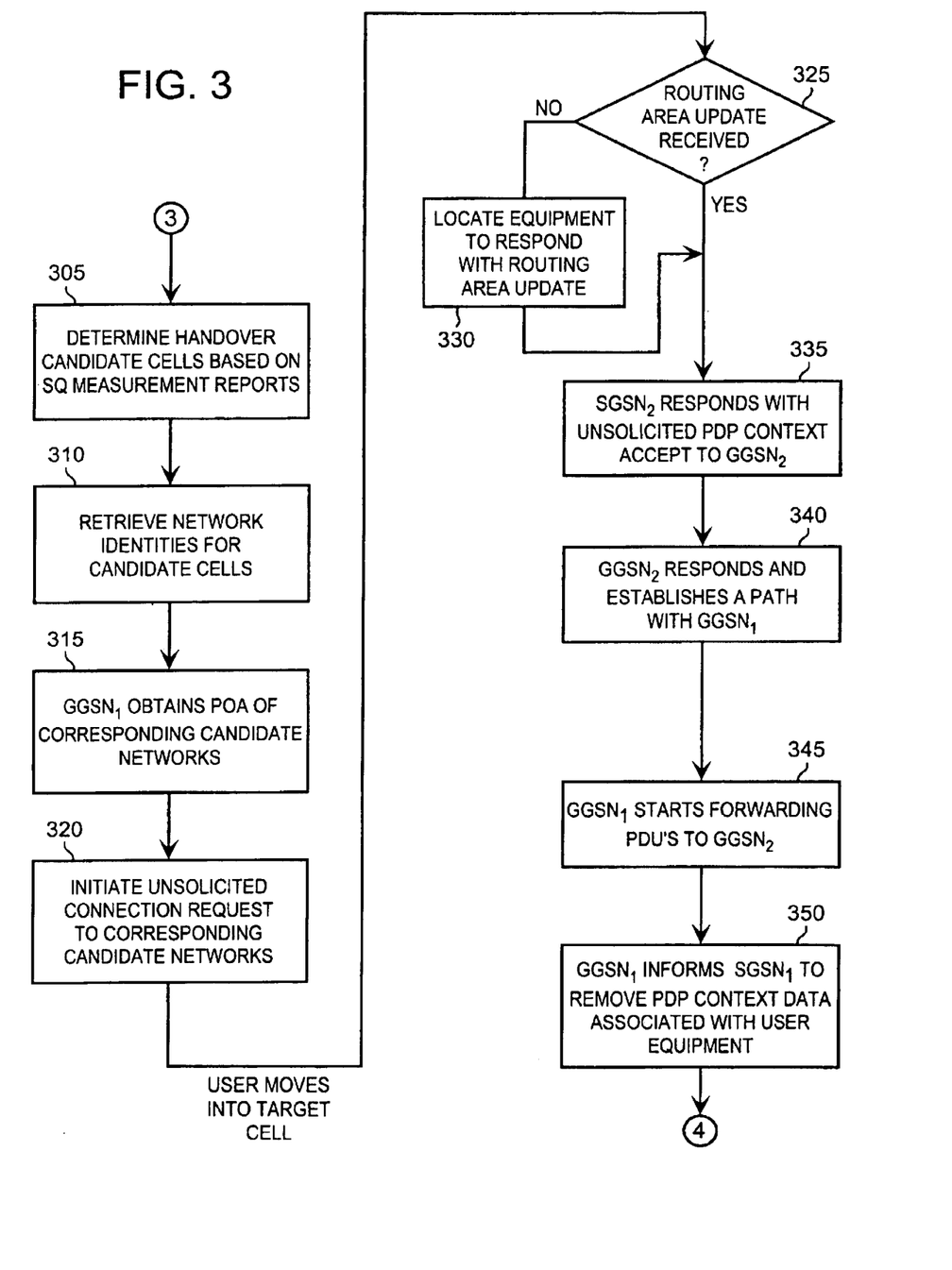
Figure 4:
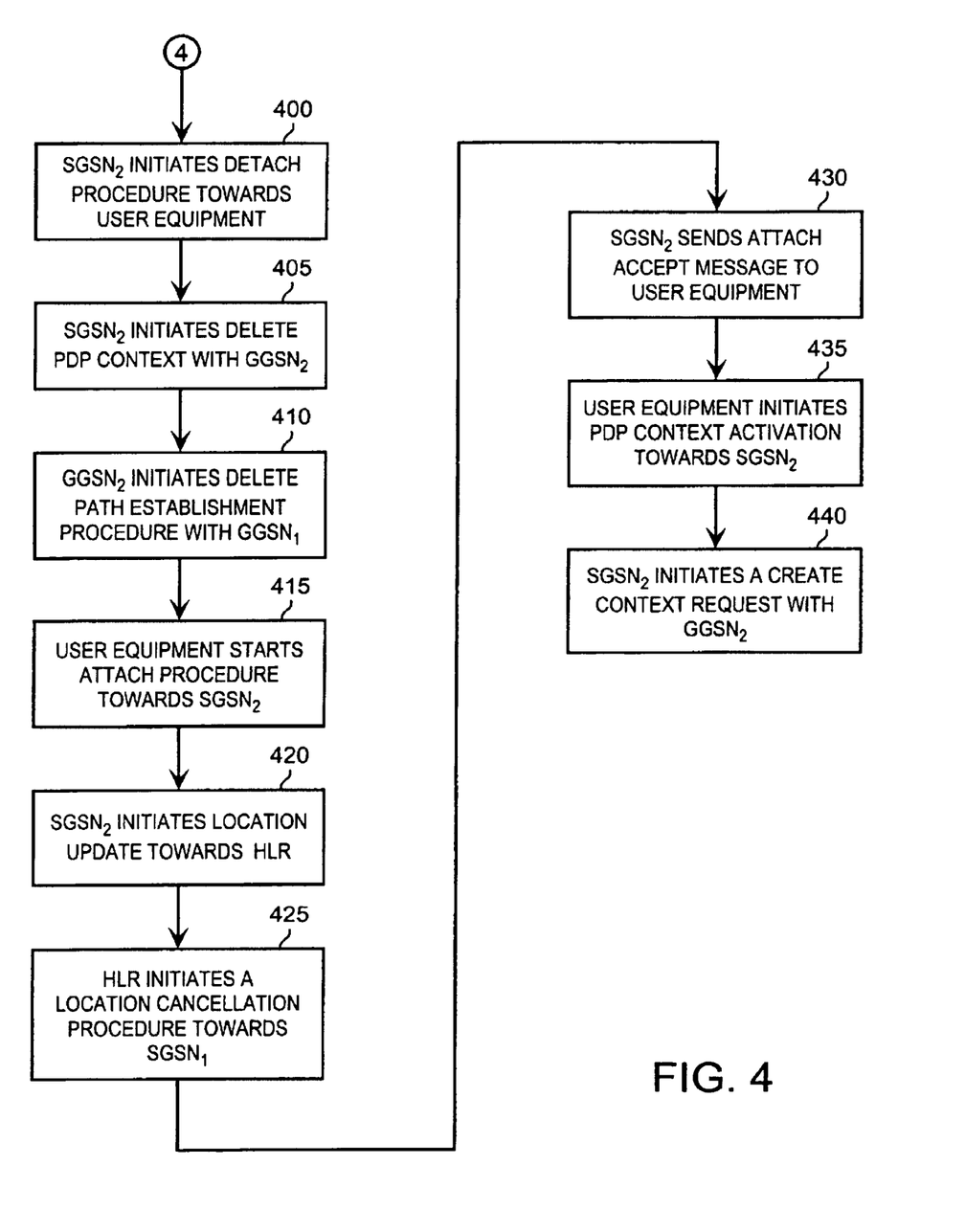
FIG. 4 is a flow diagram of a detach procedure in accordance with another exemplary embodiment of the invention.
Figure 5:
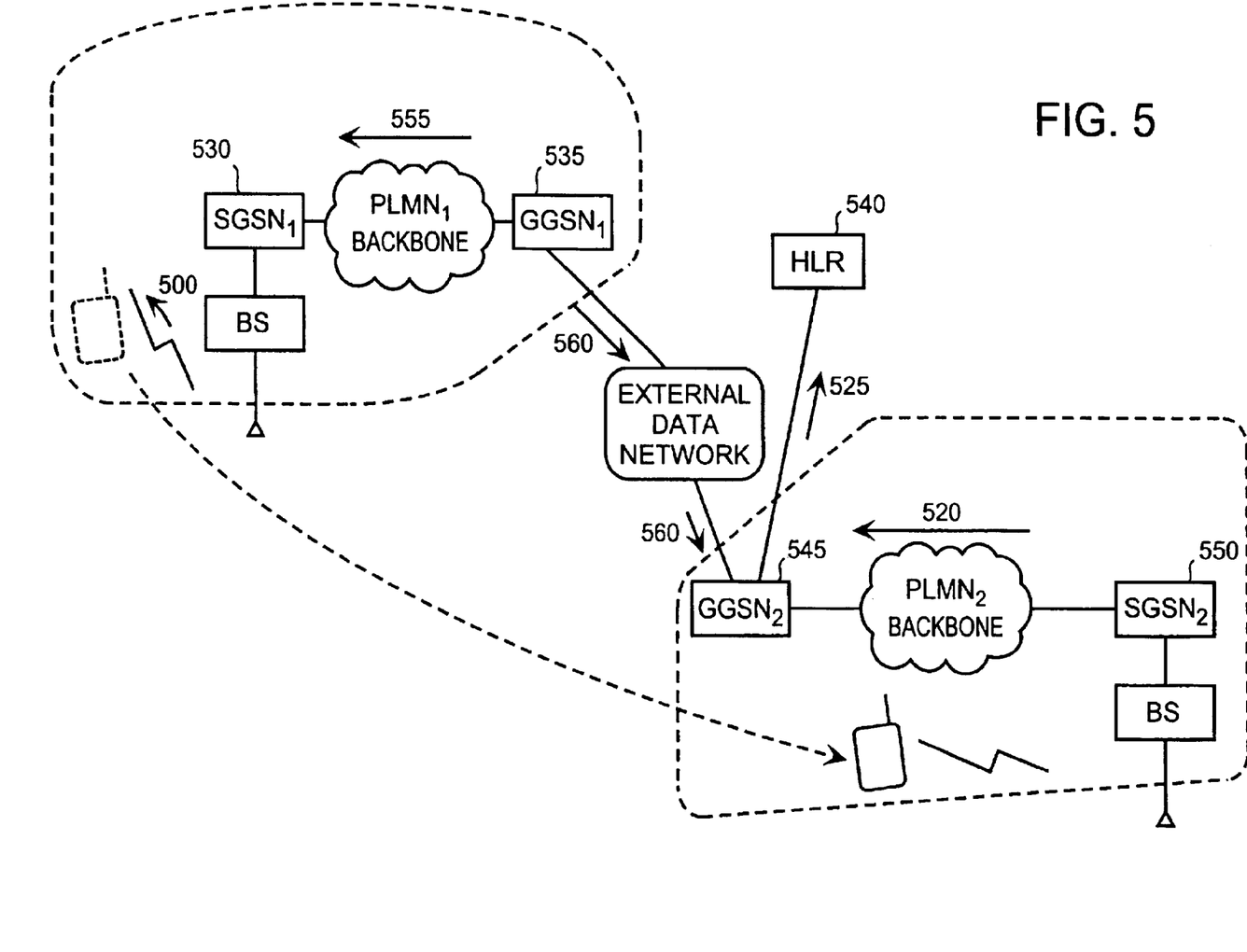
FIGS. 5–7 illustrate system diagrams showing messaging in accordance with exemplary embodiments of the invention.
Figure 6:
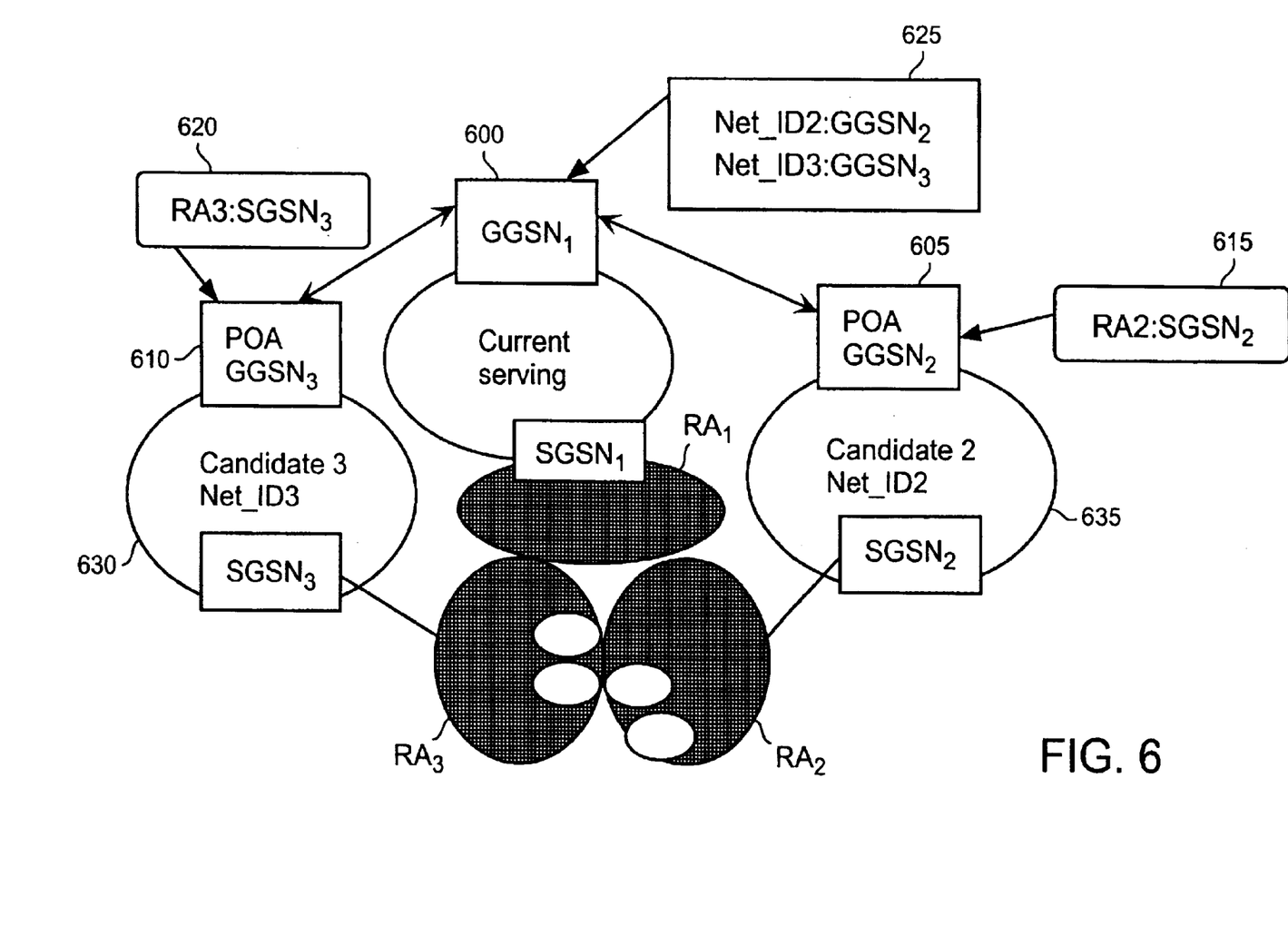
Figure 7:
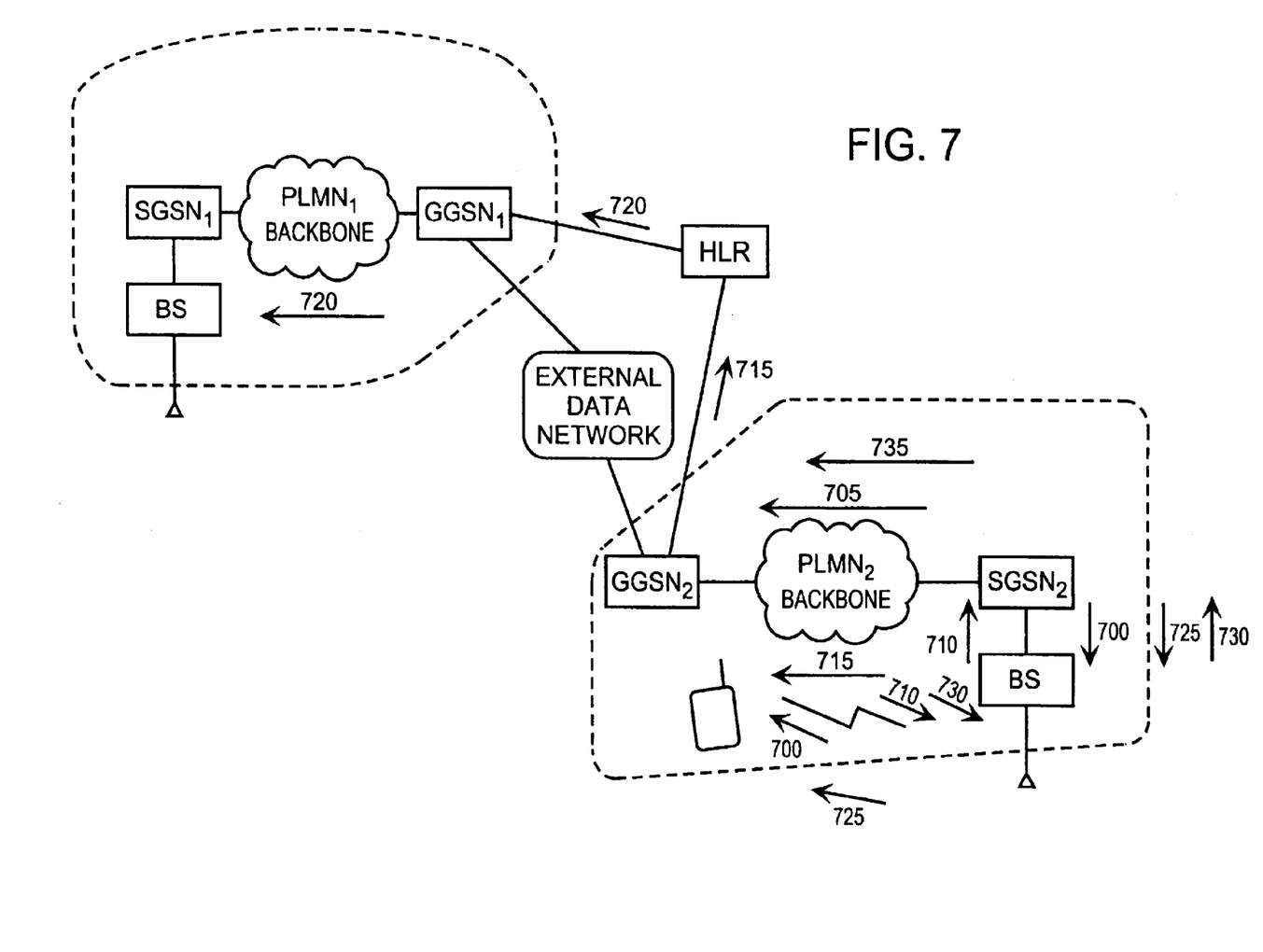
Figure 8:
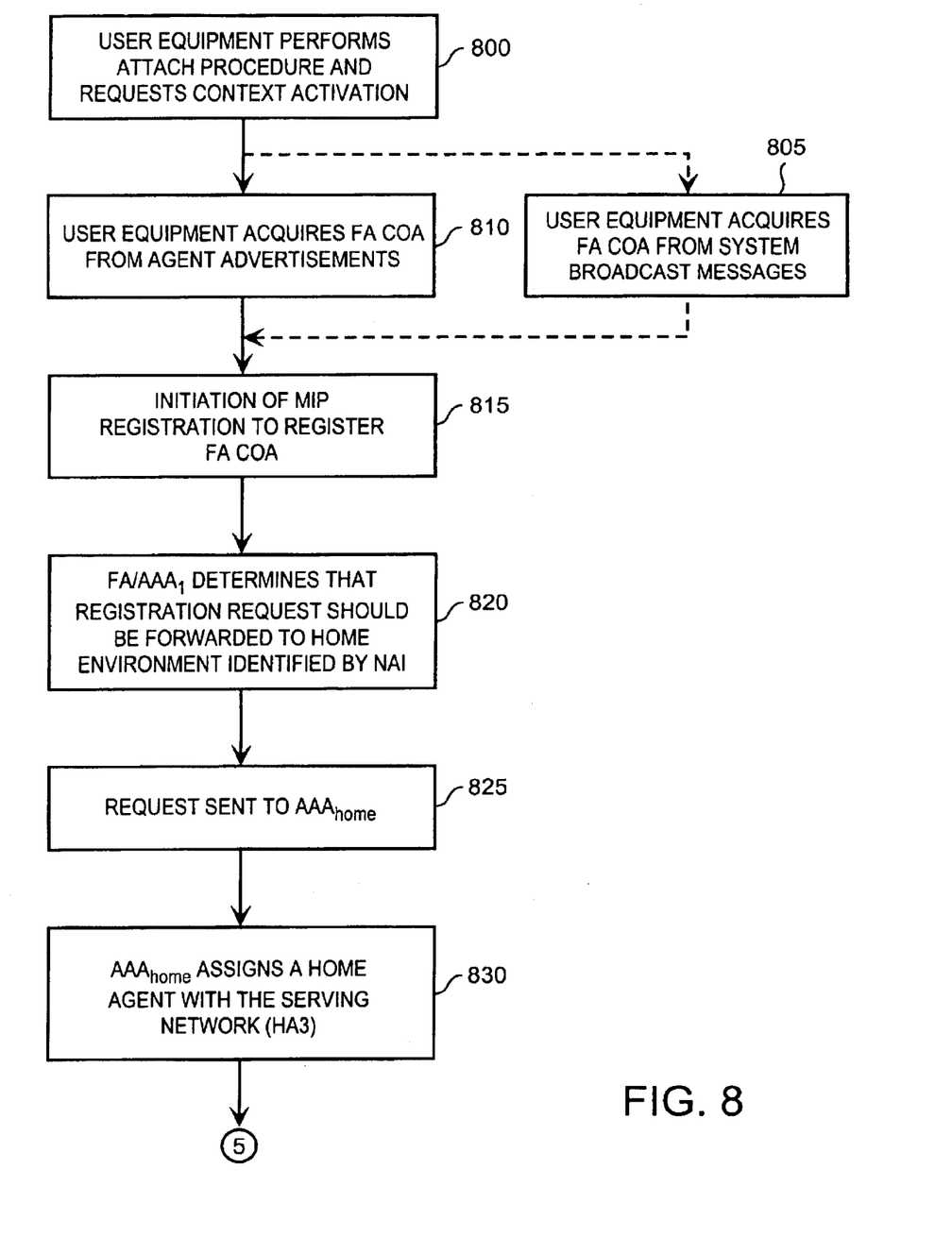
FIGS. 8–11 illustrate flow diagrams of method steps in accordance with a further exemplary embodiment of the invention.

An exemplary GPRS based method of re-routing an established session to user equipment, when the user roams from a routing area administered by a first network to a routing area administered by a second network, is illustrated in FIGS. 1–4 and 13, with associated system messaging shown in FIGS. 5–7. Beginning with FIG. 1, the user equipment first acquires 100, through possibly modified mobility management procedures, the address of the current serving GGSN ($GGSN_1$) that may subsequently be included in the optional information element contained in the PDP context accept message. This address may be acquired through messages broadcast (500; FIG. 5) on downlink control channels before the user equipment first initiates a session in the first network.

At step 110, measurements of necessary signal quality in the current and neighboring cells are performed, using conventional techniques, as the user equipment roams throughout the current network. If serving network initiated handover is used, then step 110 of FIG. 1 proceeds to step 305 of FIG. 3 (See "Serving Network Initiated Handover" section below). If either target network initiated handover, or terminal assisted handover are used then the process proceeds to step 115 of FIG. 1. An evaluation 115 of the signal quality measurements is further performed in accordance with conventional techniques to select a target cell for hand-off in the event the user equipment roams from the edge of the current cell into a neighbor cell. The $SGSN_1$ (530; FIG. 5) then can determine 120, using a local database containing roaming information, that the candidate target cell resides in a network that is external to the current serving network. If the target cell resides within the current serving network, conventional routing procedures are initiated 125. If, however, the target cell does reside in an external network (implying inter-gateway handoff), a re-routing procedure in accordance with the exemplary embodiments is performed.

Two alternative techniques can be used for re-routing the data to the user equipment in the candidate network. In a first technique (TNH), where the target network initiates handover of the data communication, $GGSN_1$ begins forwarding the buffered packets after being contacted by the GGSN in the external network ($GGSN_2$). In a second technique (TAH), where the user equipment initiates handover, $GGSN_1$ begins forwarding the buffered packets when the user equipment supplies the address of $GGSN_2$. A GPRS system has been used to illustrate the different techniques (TNH, SNH, TAH) for re-routing data. Other systems, however, can easily use these techniques to provide wide area network mobility.

Target Network Initiated Handover (TNH)

Figure 1:
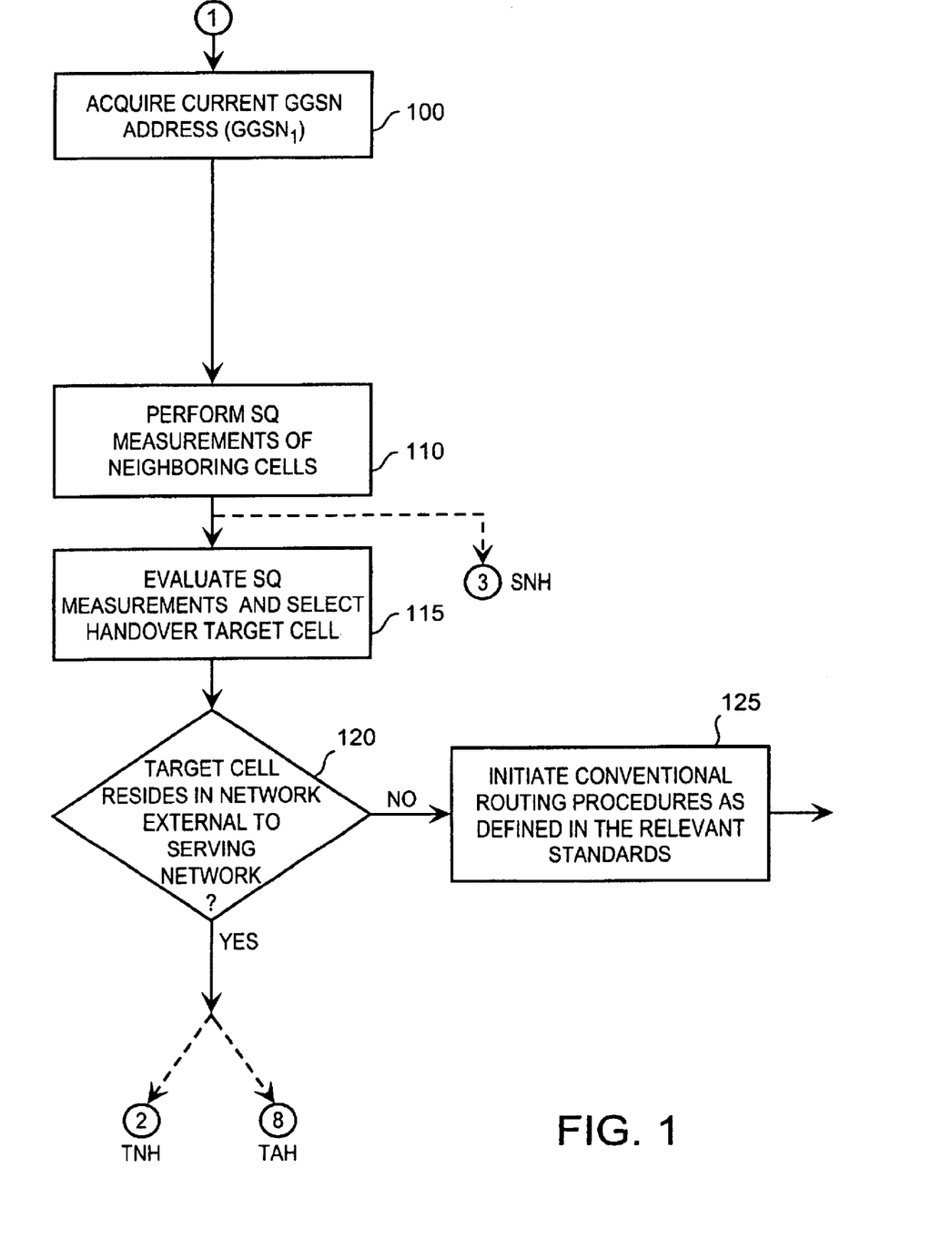
FIGS. 1–3 illustrate flow diagrams of method steps in accordance with exemplary embodiments of the invention.
Figure 2:
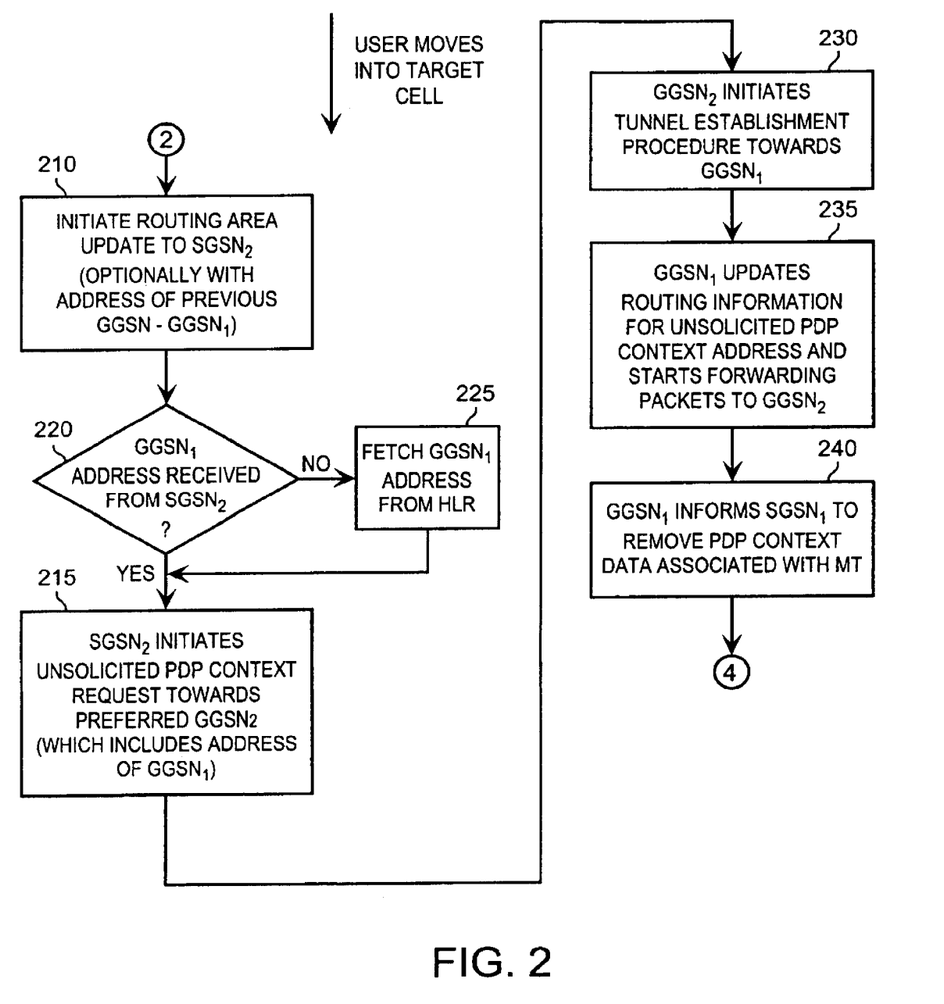

Following the acquisition 100 of the current GGSN by the user equipment (as shown in FIG. 1), an exemplary GPRS based target network initiated handover process can be performed, as illustrated in FIG. 2. In this exemplary process, the user first roams into the target cell before the user equipment initiates 210 a routing area update to the SGSN serving the target cell ($SGSN_2$). This routing area update can optionally include the address of $GGSN_1$ (535; FIG. 5) in the current serving network or other parameters such as the Routing Area ID (specified in ETSI GSM 03.60) and session parameters. $SGSN_2$ (550; FIG. 5) then initiates 215 an unsolicited PDP context request (520; FIG. 5) towards the preferred GGSN in the target network. This PDP context request will include the $GGSN_1$ address if this address has been provided by the user equipment. If this address has not been provided by the user equipment, $GGSN_2$ will fetch 225 (525; FIG. 5) the $GGSN_1$ address from the home location register (HLR) (540; FIG. 5) after receiving the unsolicited PDP context request from $SGSN_2$. $GGSN_2$ then initiates 230 a tunnel establishment procedure (e.g., IETF, ETSI GSM 9.60) towards $GGSN_1$. Buffering of data in the current serving network can be initiated by $SGSN_1$ (530; FIG. 5) after the unsolicited connection procedure has been completed. To complete the re-routing process, $GGSN_1$ updates the routing information 235 for the PDP context address and starts forwarding packets (560; FIG. 5) to $GGSN_2$. $GGSN_1$ additionally informs 240 $SGSN_1$ to remove PDP context data associated with the mobile terminal (555; FIG. 5).

Serving Network Initiated Handover (SNH)

In an exemplary GPRS based serving network initiated handover process shown in FIG. 3, the handover candidate cells are first determined 305 based on the signal quality measurement reports. Using a lookup database for the cells, the network identities (625; FIG. 6) to which networks the candidate cells belong (if they are outside the serving network) are then retrieved 310. A request is then sent to the current serving GGSN to initiate 320 an unsolicited PDP request to the corresponding candidate networks. The GGSN would first look up 315 the address for the point of attachment (POA) of these networks and then forward the unsolicited requests to the retrieved addresses. The transfer procedure begins before a target cell has been chosen by the equipment, therefore the transfer procedure/connection request will be sent to all GGSNs associated with any of the candidate cells. If any of the candidate cells could reside in the original network as well as in neighboring networks, a conventional intra-network procedure will be initiated at the same time as this new procedure. It may be possible that more than one point of attachment address is returned for one candidate network, in which case, the GGSN may choose to forward the request to all of them or to select only one address from the list.

FIG. 6 shows the scenario where two candidate networks (Candidate 2 635 and Candidate 3 630) were selected and one point of attachment is returned per candidate network. The serving GGSN initiates an unsolicited PDP context request towards $GGSN_2$ 605 and $GGSN_3$ 610 which includes information such as the current RA (routing area) and the candidate RAs ($RA_2$ 615 and $RA_3$ 620 respectively). $GGSN_2$ 605 and $GGSN_3$ 610 would look up the corresponding SGSNs using the received candidate routing area information. Once the candidate GGSN's ($GGSN_2$ and $GGSN_3$) have looked up their corresponding SGSNs ($SGSN_2$, $SGSN_3$) associated with the candidate RAs, the unsolicited PDP context request is forwarded down to the SGSNs from the GGSNs in the candidate networks. For clarification, it is noted that the relationship between SGSN and GGSN may not be one to one. Many GGSNs could contact the same SGSN.

At step 325, $SGSN_2$ and $SGSN_3$ determine if a routing area update has been received from the user equipment. If not, $SGSN_2$ and $SGSN_3$ will locate 330 the user equipment to request that the equipment respond to the locate with a routing area update. The user equipment decides to respond to the locate in $RA_2$ and responds with a routing area update message back to $SGSN_2$. Meanwhile $SGSN_3$ is informed that the user equipment is not reachable in $RA_3$ and informs $GGSN_3$ about the failure to reach the user. $GGSN_3$ responds back to the serving GGSN that candidate Net_Id3 is not able to reach the user. The serving GGSN waits for the other responses to come back from the other candidate network. When $SGSN_2$ receives the routing area update message from the user equipment as a response to the locate, it will send 335 an unsolicited PDP context message back to $GGSN_2$. $GGSN_2$ then responds 340 to the request from $GGSN_1$ by establishing a path with $GGSN_1$. Only the first successful response from a candidate GGSN would be accepted, the rest would be discarded. After the path between $GGSN_1$ and $GGSN_2$ is established, $GGSN_1$ begins 345 forwarding Packet Data Units (PDU's) to $GGSN_2$. To complete the re-routing process, $GGSN_1$ informs 350 $SGSN_1$ to remove PDP context data associated with the mobile terminal.

Terminal Assisted Handover (TAH)

Figure 13:
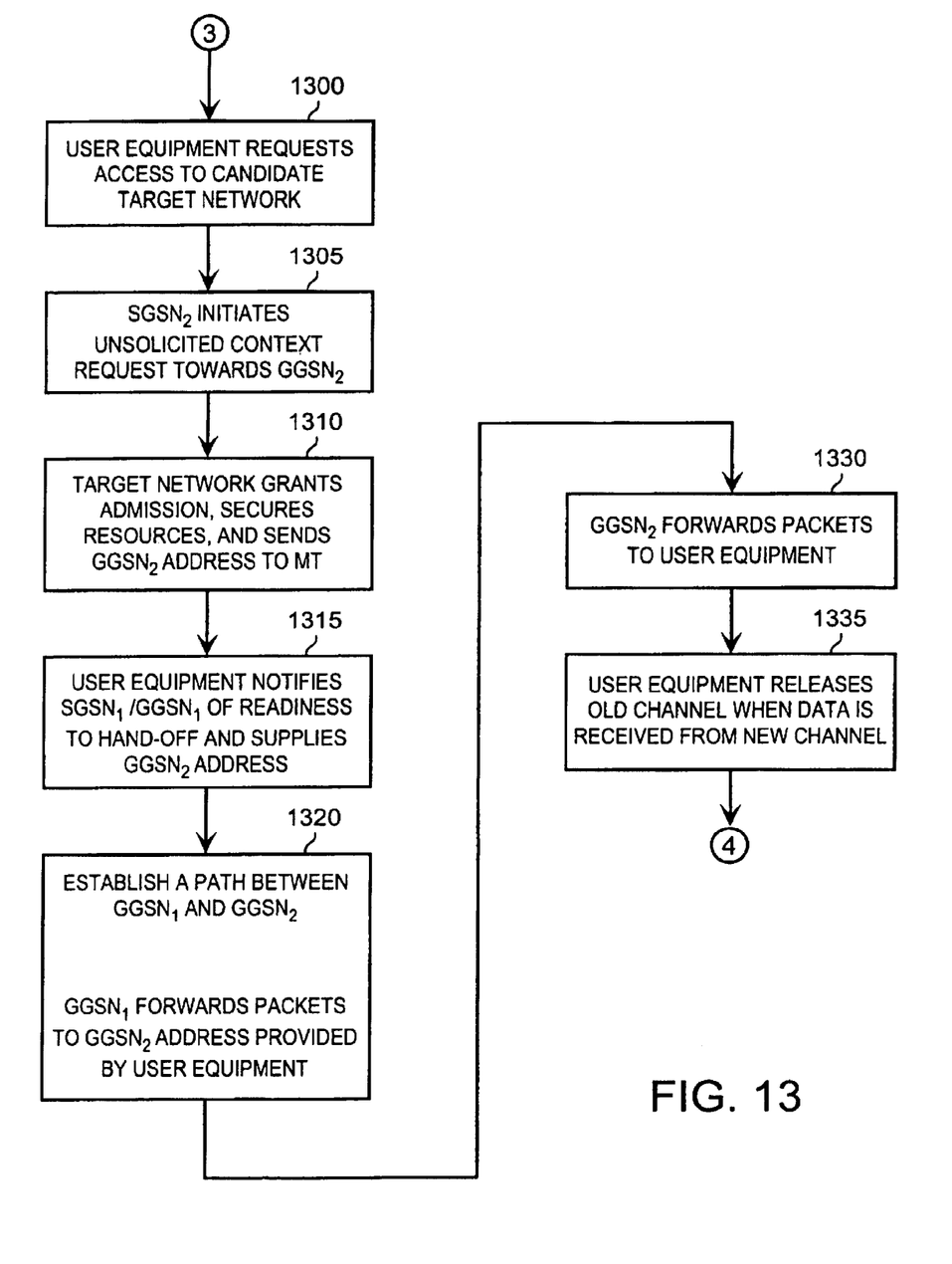
FIG. 13 illustrates a flow diagram of an exemplary terminal assisted handover process.

In an exemplary GPRS based terminal assisted handover process shown in FIG. 13, the user equipment (e.g., terminal) itself initiates the hand-off to the target network. Once the user equipment selects a target cell (115; FIG.1), the user equipment requests (1300; FIG. 13) access to the target network using, for example, an access handoff message. This request would include the type of service required, the quality of service, the session information, and the address of the GGSN of the network currently serving the user equipment (address of $GGSN_1$). In response to the access request from the user equipment, an unsolicited context request would be initiated 1305 from $SGSN_2$ in the target routing area towards $GGSN_2$ in the target network. The target network would then grant 1310 admission to the user equipment and secure resources to provide a connection with the equipment. The target network would further provide the address of the serving GGSN ($GGSN_2$) in the target network to the user equipment. The user equipment subsequently notifies 1315 the current serving $SGSN_1/GGSN_1$ of the equipment's readiness for handoff and supplies the address of $GGSN_2$. $SGSN_1$ requests $GGSN_1$ to buffer the data. The user equipment may also supply a new PDP address if provided by the target network.

In response to the notification from the user equipment, the serving $GGSN_1$ then starts forwarding 1320 data packets intended for the user equipment to the GGSN address ($GGSN_2$) provided by the user equipment. When the user equipment begins receiving data 1330 from the new channel established with the target network, the user equipment releases 1335 the old channel with the previous network.

Following completion of any of the three of the inter-GGSN packet re-routing techniques described above, an optional procedure for PDP context deactivation may be performed as shown in FIG. 4. The method of FIG. 4 may be initiated following the termination of Packet Data Unit (PDU) transfer from $GGSN_1$ to $GGSN_2$. In this exemplary method, $SGSN_2$ first initiates 400 a Detach procedure (700; FIG. 7) towards the user equipment, requesting that the terminal initiate Attach and PDP context activation procedures. The $SGSN_2$ then initiates 405 a Delete PDP context (705; FIG. 7) with the serving $GGSN_2$. In turn, the $GGSN_2$ initiates 410 a procedure to delete path establishment with $GGSN_1$.

Subsequent to the delete path procedure by $GGSN_2$, the user equipment begins 415 an Attach procedure (710; FIG. 7) towards $SGSN_2$, using conventional messaging such as, for example, that described in the GSM Standard 03.60. In response to the Attach request from the user equipment, $SGSN_2$ initiates 420 a location update request (715; FIG. 7) towards the HLR. The HLR then initiates 425 a location cancellation procedure (720; FIG. 7) towards $SGSN_1$. $SGSN_2$ then sends 430 an Attach accept message (725; FIG. 7) to the user equipment, which in turn responds by initiating 435 an Activate PDP context request (730; FIG. 7) towards $SGSN_2$. Subsequently, $SGSN_2$ initiates 440 a create PDP context request (735; FIG. 7) with $GGSN_2$. The user equipment or $SGSN_2$ may request a PDP context activation with GGSN, in certain circumstances such that $GGSN_2$ creates a hierarchical tunnel between $GGSN_2$ and $GGSN_1$. For example, the hierarchical tunnel may be created in the circumstance where a connection request cannot be satisfied by the current serving network.

Target Network Initiated Handover Using MobileIP

Figure 10:
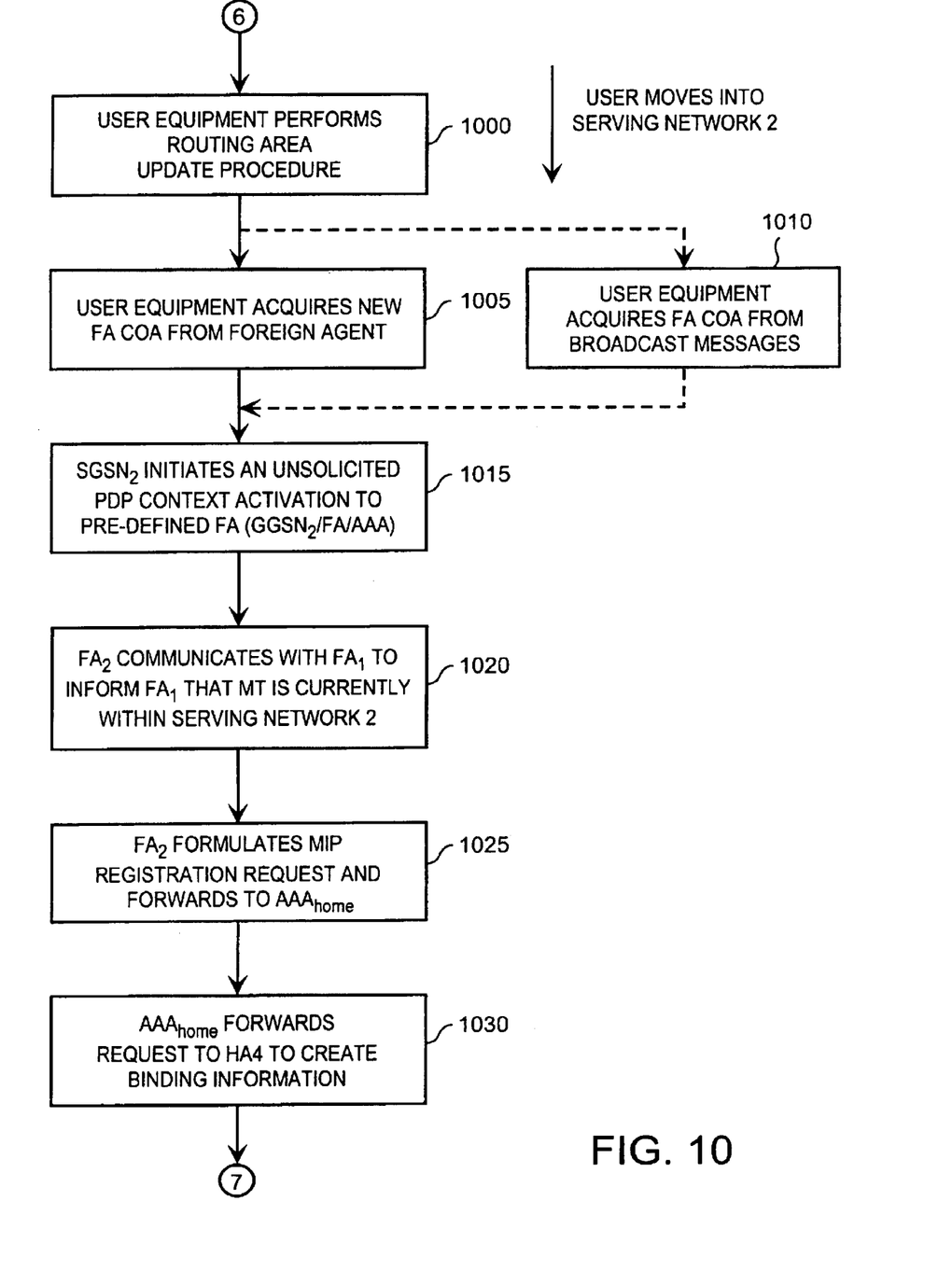
Figure 11:
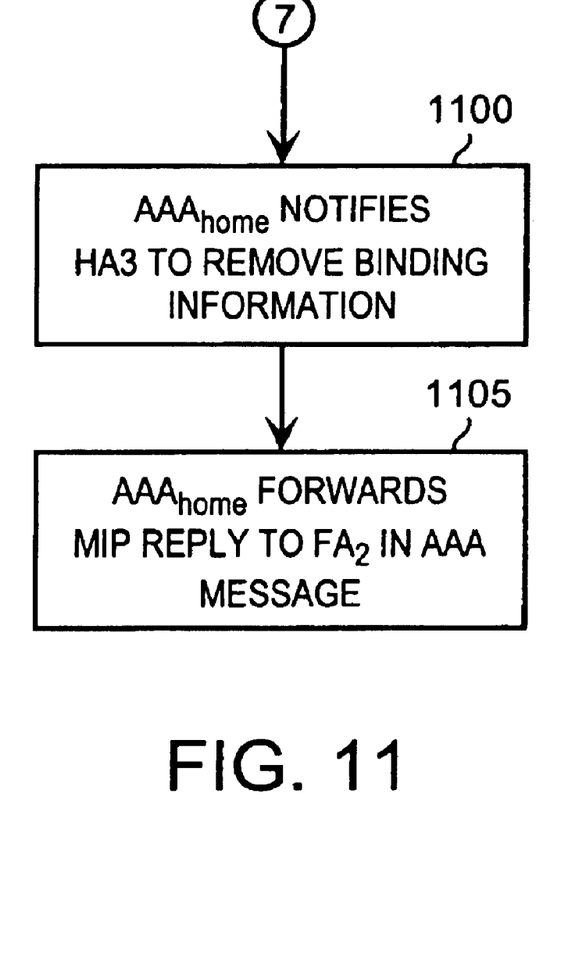
Figure 12:
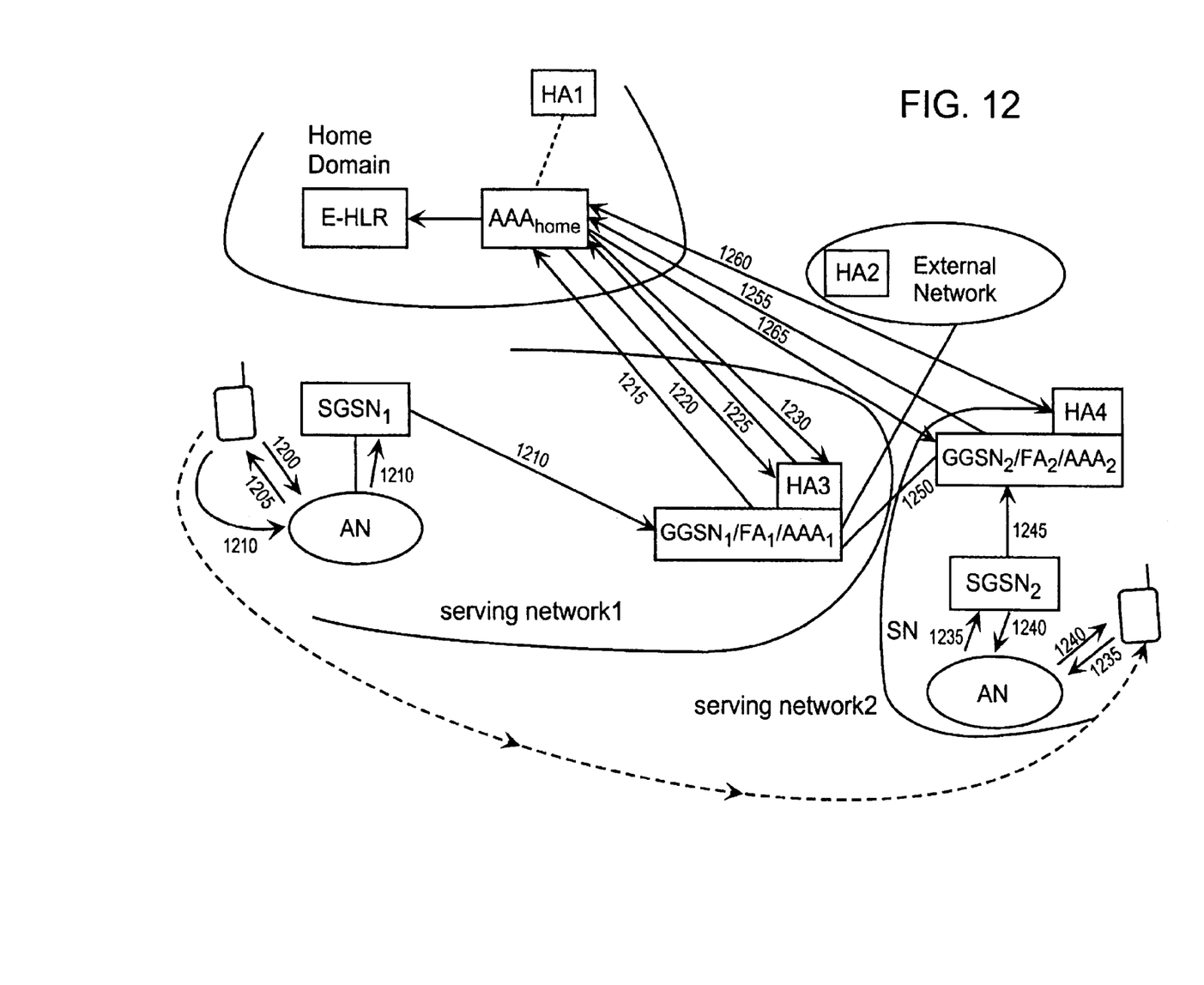
FIG. 12 illustrates a system diagram showing messaging in accordance with an exemplary embodiment of the invention.

Another exemplary embodiment of the invention for providing seamless data communication between two packet networks is shown in FIGS. 8–11, with associated system messaging shown in FIG. 12. In this solution to the problem of re-routing packet data when user equipment roams from a routing area administered by a first serving network to a routing area administered by a second serving network, it is assumed that the first and second serving networks communicate using MobileIP protocol. At step 800, the user equipment first performs an attach procedure and requests PDP context activation (1200; FIG. 12) when registering in the first serving network ("Serving Network 1"). At step 810, the user equipment acquires (1205; FIG. 12) the care-of address of the local foreign agent ($GGSN_1/FA_1/AAA_1$) in the first serving network from agent advertising messages that are broadcast by the foreign agent in accordance with conventional techniques. As shown at optional step 805, the user equipment may alternatively acquire the foreign agent care-of address (FA COA) through modified system messages broadcast over the air interface.

After acquisition of the FA COA, the user equipment initiates 815 a MIP registration request (1210; FIG. 12) to the local foreign agent ($GGSN_1/FA_1/AAA_1$) in serving network 1. The MIP request would include a Network Access Identifier (NAI) that identifies the user equipment's home environment. The MIP registration request, however, may be included as an optional information element within the original PDP context Activation message from the user equipment so as to minimize the signaling sequence. If, though, the user equipment is not MIP capable, then the GGSN in the current serving network can assume the role of surrogate agent and initiate a MIP registration request after PDP context activation on behalf of the user equipment.

Figure 9:
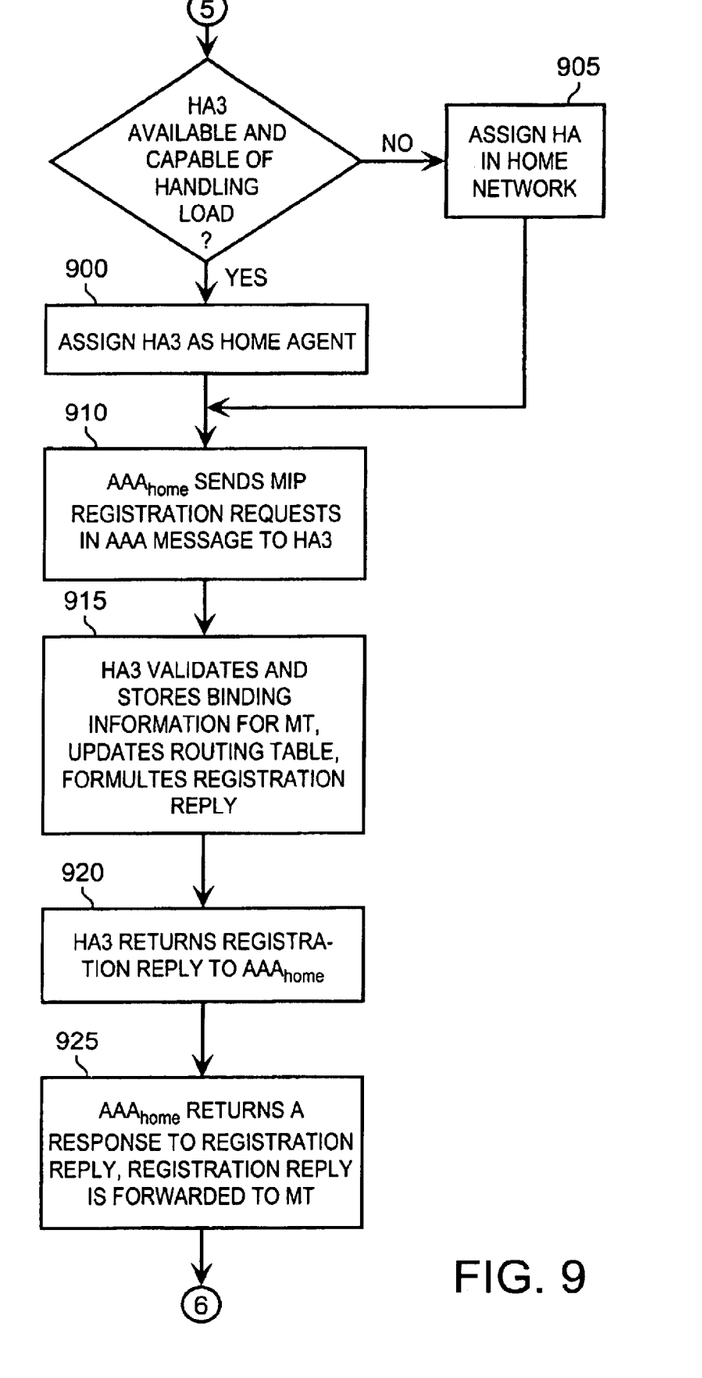

The $FA_1/AAA_1$ component of $GGSN_1$ then determines 820 that the registration request must be forwarded to the home environment identified by the NAI. $FA_1/AAA_1$ sends 825 the registration request (e.g., a DIAMETER message) (1215; FIG. 12) to the AAA server ($AAA_{home}$) in the home environment. If the registration request requests the assignment of a home agent, $AAA_{home}$ will attempt to assign a home agent (HA3) from the serving network if one is available and is capable of handling the load 900. If one is not available, $AAA_{home}$ will assign 905 a home agent in the home environment HA1. $AAA_{home}$ then forwards 910 the MIP registration request (1220; FIG. 12) in an AAA message to HA3.

Upon receipt of the forwarded MIP registration request, HA3 validates 915 and stores binding information for the mobile terminal and then updates the routing table. HA3 then formulates a registration reply (1225; FIG. 12) and returns 920 it to the $AAA_{home}$ server in the home environment. The $AAA_{home}$ server returns 925 a response 1230 to the registration reply and the registration reply message is forwarded to the user equipment.

Subsequent to the above-described registration procedure, the user may roam to a new routing area serviced by a new SGSN ($SGSN_2$) in a network administered by a different service provider. The user equipment then performs 1000 a routing area update procedure (1235; FIG. 12), wherein the routing area parameters may include additional information such as the old foreign agent address and the current home agent address. The user equipment would then acquire 1005 the new FA COA from an unsolicited PDP context activation response (1240; FIG. 12) from the new foreign agent in the new GGSN. Optionally, the user equipment could acquire 1010 the FA COA in system broadcast messages.

The new SGSN ($SGSN_2$) then determines if MIP connectivity is required. If MIP connectivity is required, and is supported by $GGSN_2$, $SGSN_2$ initiates 1015 an unsolicited PDP context activation which may contain information regarding the old foreign agent, the current home agent, and the NAI. The activation request (1245; FIG. 12) would be sent to a pre-defined foreign agent such as $GGSN2/FA_2/AAA_2$. If roaming agreements between the provider of serving network 1 and the provider of serving network 2 permit, the new foreign agent $FA_2$ communicates (1250; FIG. 12) with the old foreign agent $FA_1$ to inform $FA_1$ that the user equipment is currently located within $FA_2$'s service area. $FA_2$ then formulates 1025 a MIP registration request using the information received in the unsolicited PDP context activation and forwards the request (1255; FIG. 12) to $AAA_{home}$. This MIP registration request may indicate that a new home agent be allocated. $FA_2$ will now be ready to receive forwarded packets.

After receipt of the MIP registration request from $FA_2$, the home environment AAA server forwards 1030 the request (1260; FIG. 12) to the home agent HA4 in serving network 2 to create binding information for the user equipment and to update the routing table. When a successful MIP registration reply is received, $AAA_{home}$ notifies 1100 HA3 to remove the binding information if not currently in use. $AAA_{home}$ then forwards 1105 the MIP reply answer (1265; FIG. 12) to $FA_2$ in an AAA message.

The above described exemplary embodiments describe inter-packet domain roaming in either GPRS or MobileIP networks. However, one skilled in the art will recognize that these exemplary techniques can be applied to any IP based communication protocol. For example, the exemplary embodiments describing inter-packet domain roaming using MobileIP protocol can be applied to other multi-media networks such as H.323 or SIP. The protocols currently defined in H.323 and SIP would need to be changed to include this functionality in accordance with the exemplary embodiments.

The above described exemplary embodiment describes how session mobility between two packet networks in a wireless system is achieved. A session, as is known today in the datacom world, is used to run one or more applications (e.g., voice over IP, web browsing). A session is transparent to the network layer, therefore when a user moves from one network to another, the session is unaware that the lower layers are reconfigured due to a new re-established connection. Session mobility involves a user having an active session on his/her user equipment and moves together with the equipment towards a new area served by a new network. The two networks cooperate in order to allow the user to continue working with his/her ongoing session.

Session mobility also involves a user having an open and active session running on his/her user equipment and moving without taking the equipment to another network (e.g., from work to home). The user, in the new network decides to connect to and continue with the same session through a different terminal. The exemplary embodiments described above could be used to allow for both scenarios. The second scenario, however, allows for total network transparency and permits the user to connect to an ongoing session via another terminal located in a different network that may be wireless or fixed. For example, if a user is engaged in a session at a first terminal connected to a first network, the user may connect to a second terminal in a second network and the session may be re-routed, applying the exemplary embodiments described above, to the new terminal without loss of the ongoing session. Re-routing of the session may be achieved using a new user interface at the first terminal which prompts the user to enter the terminal to which the user is transferring. The input terminal information is then converted to a location (e.g., network entity address serving the terminal) of the new system by querying a local database (e.g., DNS).

Although a number of embodiments are described herein for purposes of illustration, these embodiments are not meant to be limiting. Those skilled in the art will recognize modifications that can be made in the illustrated embodiments. Such modifications are meant to be covered by the spirit and scope of the appended claims.

What is claimed is:

1. A method of keeping a session active and connected with a mobile device while changing data communications networks, from a first data communication network to a second data communication network, comprising the steps of:

receiving all packets, associated with a session, over a first connection in said first data communications network wherein said first connection is handled by a first gateway associated with said first data communications network regardless of whether said mobile device is located within said first or second data communication network;

requesting a second connection with a second data communications network while said mobile device is moving towards the second data communication network;

determining that said mobile device is in said second data communication network:

initiating a transition to said second data communication network by sending a Packet Data Protocol context request towards said first data communication network, said context request including an address of said first gateway provide by said mobile device and if said first gateway address is not present in the context request, retrieving said first gateway address from a Home Location Register (HLR) of said first data communication network;

acquiring an address of a second gateway associated with the second data communications network and assigned to handle said second connection;

establishing a tunnel between said first gateway associated with the first data communications network serving said first connection and said second gateway;

routing said packets associated with said session and received by said first gateway over said established tunnel to said second gateway and over the second connection based on the acquired gateway address to said mobile device.

2. The method of claim 1, wherein an entity in the second data communications network initiates the request for the establishment of said tunnel.

3. The method of claim 2 wherein said second gateway provides network identity associated with said second gateway to said first gateway.

4. The method of claim 2 wherein said second gateway retrieves network identity associated with said first gateway from a centralized database.

5. The method of claim 1, wherein said first gateway in the first data communications network initiates the request for the establishment of said tunnel.

6. The method of claim 5 wherein said first gateway provides network identity associated with said first gateway to said second gateway.

7. The method of claim 5 wherein said first gateway buffers data Intended for said mobile device until said tunnel has been establish with said second gateway.

8. The method of claim 1, wherein mobile device initiates the request for the second connection.

9. The method of claim 8 wherein said mobile device provides the first data communications network with network identity associated with said second gateway.

10. The method of claim 8 wherein said mobile device provides the second data communications network with network identity associated with said first gateway.

11. The method of claim 1 wherein said first gateway is a Gateway General Packet Radio Services Serving Node (GGSN).

12. The method of claim 1 wherein said first data communications network communicates with said second data communications network using Mobile IP protocol.

* * * * *

UNITED STATES PATENT AND TRADEMARK OFFICE
CERTIFICATE OF CORRECTION

PATENT NO. : 6,904,025 B1  
APPLICATION NO. : 09/416757  
DATED : June 7, 2005  
INVENTOR(S) : Lila Madour et al.

It is certified that error appears in the above-identified patent and that said Letters Patent is hereby corrected as shown below:

On the Face Page, Field (56). under "OTHER PUBLICATIONS", in Column 2, Line 2, after "IEEE." delete "☐☐☐☐".

In Column 1, Line 30, delete "interGGSN" and insert -- inter-GGSN --, therefor.

In Column 1, Line 64, delete "fist" and insert -- first --, therefor.

In Column 8, Line 51, in Claim 1, after "networks" delete ",".

In Column 8, Line 65, in Claim 1, after "network" delete ":" and insert -- ; --, therefor.

In Column 9, Line 3, in Claim 1, delete "provide" and insert -- provided --, therefor.

In Column 10, Line 9, in Claim 7, delete "Intended" and insert -- intended --, therefor.

Signed and Sealed this

Thirteenth Day of November, 2007

JON W. DUDAS  
*Director of the United States Patent and Trademark Office*